(12) United States Patent
Baxter, Jr.

(10) Patent No.: US 8,325,885 B1
(45) Date of Patent: Dec. 4, 2012

(54) CALL DIVERSION FOR TELEPHONY APPLICATIONS

(75) Inventor: John Francis Baxter, Jr., Ubonratchatani (TH)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 12/688,376

(22) Filed: Jan. 15, 2010

Related U.S. Application Data

(62) Division of application No. 10/908,226, filed on May 3, 2005, now Pat. No. 7,676,026.

(60) Provisional application No. 60/594,058, filed on Mar. 8, 2005.

(51) Int. Cl.
- H04M 3/58 (2006.01)
- H04L 29/06 (2006.01)
- G10L 17/00 (2006.01)
- H04N 7/14 (2006.01)

(52) U.S. Cl. ............... 379/88.01; 348/14.01; 348/14.04; 370/352; 370/354; 379/88.19; 379/88.26; 379/114.05; 379/209.1; 379/266.01; 455/412.1; 704/243; 704/246; 704/270; 709/213; 714/4.4; 714/11

(58) Field of Classification Search ............... 348/14.01, 348/14.04; 370/352, 354; 379/88.01, 88.19, 379/88.23, 88.26, 209.01, 266.06, 114.05; 704/246, 270, 243; 455/412.1; 709/213; 714/11, 4.4

See application file for complete search history.

(56) References Cited

U.S. PATENT DOCUMENTS

| | | | |
|---|---|---|---|
| 5,091,947 A | | 2/1992 | Ariyoshi et al. |
| 5,165,095 A | | 11/1992 | Borcherding |
| 5,384,833 A | | 1/1995 | Cameron |
| 5,544,229 A | * | 8/1996 | Creswell et al. ......... 379/114.05 |
| 5,727,047 A | | 3/1998 | Bentley et al. |
| 5,774,841 A | | 6/1998 | Salazar et al. |
| 6,088,669 A | | 7/2000 | Maes |
| 6,230,190 B1 | * | 5/2001 | Edmonds et al. ............. 709/213 |
| 6,243,676 B1 | * | 6/2001 | Witteman ..................... 704/243 |
| 6,397,345 B1 | * | 5/2002 | Edmonds et al. ............. 714/4.4 |
| 6,412,079 B1 | * | 6/2002 | Edmonds et al. ............... 714/11 |
| 6,529,871 B1 | | 3/2003 | Kanevsky et al. |
| 6,661,785 B1 | * | 12/2003 | Zhang et al. .................. 370/352 |
| 6,792,083 B2 | | 9/2004 | Dams et al. |
| 6,862,347 B1 | | 3/2005 | Umstetter et al. |
| 6,873,951 B1 | | 3/2005 | Lin et al. |
| 6,931,375 B1 | | 8/2005 | Bossemeyer, Jr. et al. |
| 6,961,410 B1 | * | 11/2005 | Castagna ................... 379/88.23 |
| 7,024,363 B1 | * | 4/2006 | Comerford et al. ........... 704/270 |
| 7,245,611 B2 | * | 7/2007 | Narasimhan et al. ......... 370/354 |
| 7,302,391 B2 | | 11/2007 | Reding et al. |
| 7,324,942 B1 | * | 1/2008 | Mahowald et al. ........... 704/270 |

(Continued)

*Primary Examiner* — Gerald Gauthier
(74) *Attorney, Agent, or Firm* — Espartaco Diaz Hidalgo

(57) ABSTRACT

A method of initiating outbound calls through a telephony interface. The method accepts an inbound call from a user, authenticates the inbound call against a predetermined user identity, accesses an address book associated with the user identity, receives an spoken request from the user, selects a telephone record in the address book associated with the spoken request, initiates an outbound call to the telephone record; and connects the inbound call with the outbound call responsive to a connection established on the outbound call. In an alternative embodiment the method accepts an inbound call, authenticates the inbound call against a predetermined user identity, receives a dual-tone frequency-modulated input representing a desired outbound call target, initiates an outbound call to the outbound call target, and connects the inbound call with the outbound call responsive to a connection established on the outbound call. A corresponding computer system for each embodiment is also provided.

5 Claims, 6 Drawing Sheets

U.S. PATENT DOCUMENTS

| | | | |
|---|---|---|---|
| 7,342,919 B2 * | 3/2008 | Zhang et al. | 370/352 |
| 7,426,268 B2 * | 9/2008 | Walker et al. | 379/266.01 |
| 7,590,232 B2 * | 9/2009 | Carter et al. | 379/209.01 |
| 7,640,006 B2 * | 12/2009 | Portman et al. | 455/412.1 |
| 7,843,485 B1 * | 11/2010 | Chen et al. | 348/14.01 |
| 7,991,129 B2 * | 8/2011 | Timmins et al. | 379/88.26 |
| 2004/0066916 A1 * | 4/2004 | Brown et al. | 379/88.01 |
| 2004/0090954 A1 * | 5/2004 | Zhang et al. | 370/352 |
| 2006/0020459 A1 * | 1/2006 | Carter et al. | 704/246 |
| 2006/0023849 A1 * | 2/2006 | Timmins et al. | 379/88.19 |
| 2011/0043596 A1 * | 2/2011 | Chen et al. | 348/14.04 |

* cited by examiner

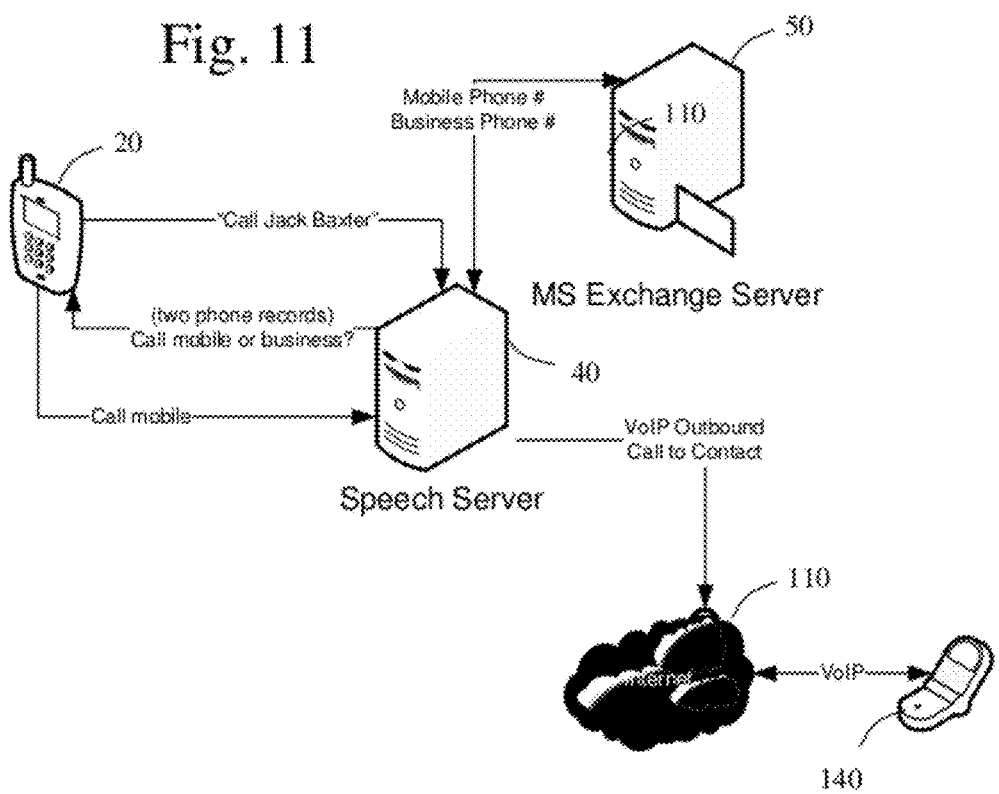

CALL DIVERSION FOR TELEPHONY APPLICATIONS

CROSS REFERENCE TO RELATED APPLICATIONS

This application is a divisional of U.S. patent application Ser. No. 10/908,226, entitled "Desktop Telephony System," filed May 3, 2005, the contents of which are herein incorporated by reference, which claims the benefit of priority to U.S. Provisional Patent Application 60/594,058, entitled, "Desktop Telephony System," filed Mar. 8, 2005, the contents of which are herein incorporated by reference.

FIELD OF INVENTION

This invention relates to telephony applications; more specifically, a method of call diversion of inbound and outbound calls.

BACKGROUND

While consumers and corporations have largely embraced the torrential downpour of new technology there is a quietly growing movement to make online communications less obtrusive. Bluetooth wireless connectivity is heralded as "getting rid of the tangle of cords on the desktop." Flat panel monitors consume less desk space and "small form factor" CPUs are offered by every major computer manufacturer.

Palm pilots, Blackberry devices, Pocket PCs and smart phones all claim to offer mobile freedom. In reality, these devices all tether the end user to a particular hardware platform to access the information. Users must learn the intricacies of each platform before it becomes obsolete. The novelty of new technology is wearing thin. The next wave of engineering must reevaluate how humans interact with information systems. Flat panels, graphic resolutions and graphic-user-interfaces have improved visual communication, but they still require the end user to sit beholden to a glowing liquid crystal display.

What is needed is a sea change in thinking. When artists conceive of truly advanced information systems, the human-system interaction is virtually always a voice interface.

A complete voice interface must necessarily include full voice recognition independent of dialect, accents and other nuisances. Companies like IBM and Dragon Systems have marketed speech recognition software for more than a decade for desktop use and mobile devices with limited speech recognition appeared ago several years ago. Until now, such devices have largely been "speaker dependent." In other words, they function only for their principal users and require training to recognize individual words.

Faster processors and more efficient software are enabling new speaker-independent systems that can recognize the speech of any user and require no training. These systems can discern thousands, rather than dozens, of names and are designed to work even when the speaker is in a noisy environment, such as the front seat of a speeding car.

While true speaker-independent systems are not yet widely available at the time of this patent application filing, an infrastructure may be created to wrap traditional desktop functions into a telephony interface with incremental enhancements of speech recognition as the technology fills the gap.

Telephony has been defined as "technology associated with the electronic transmission of voice, fax, or other information between distant parties using systems historically associated with the telephone, a handheld device containing both a speaker or transmitter and a receiver." Telephony has traditionally been focused on call-center automation. Banking, billing, customer support, automated attendants are all examples of common telephony applications. The present invention brings telephony to desktop and server software applications that traditionally required manual input.

SUMMARY

The present invention includes a method of authenticating an inbound caller for telephony applications including the steps of: establishing at least one predetermined caller identification telephone number from which inbound calls are permitted, associating the caller identification telephone number with at least one inbound caller identity whereby caller identification data retrieved from an inbound caller is used to authenticate the at least one inbound caller identity. Permissible time slots for inbound calls may be established whereby authentication is achieved only during permitted time slots. The permissible time slots are selected from the group consisting of minutes, hours, days of the week, days of the month, months and years. Additional security may be achieved by authenticating the inbound caller by voice print and/or by dual tone multi frequency code.

The present invention also includes a method of adapting telephony applications to individual users including the steps of: accepting a first user-initiated voice command, interpreting the first voice command by speech recognition, comparing the interpreted command against an array of predetermined options, resolving whether a match exists between the interpreted command and the predetermined options, responsive to a non-match, queuing the non-matched command, accepting a second user-initiated voice command, interpreting the second voice command by speech recognition, matching the second voice command with an individual predetermined option and associating the non-matched command with the individual predetermined option whereby the first user-initiated voice command is automatically equated to the matched second voice command in future procedures.

A confidence value may be assigned to the association of the non-matched command with the individual predetermined option and adjusting the confidence value responsive to future events whereby the association may be reinforced or broken responsive to future procedures.

An alternative embodiment includes the steps of: accepting a first user-initiated voice command, interpreting the first voice command by speech recognition, comparing the interpreted command against an array of predetermined options, resolving whether a match exists between the interpreted command and the predetermined options, responsive to a non-match, queuing the non-matched command, broadcasting the predetermined options for selection, accepting a second user-initiated voice command, interpreting the second voice command by speech recognition, matching the second voice command with an individual predetermined option and associating the non-matched command with the individual predetermined option whereby the first user-initiated voice command is automatically equated to the matched second voice command in future procedures.

Yet another embodiment of the invention includes a method of speaker-independent telephony dictation including the steps of: receiving an audio stream of spoken words, digitizing the audio stream into an audio file, and transcribing the audio file into a text-based file. The text-based file may be emailed or faxed to a predetermined target or saved to a storage device such as a hard drive.

Yet another embodiment of the invention includes a method of initiating outbound calls through a telephony interface including the steps of: accepting an inbound call, authenticating the inbound call against a predetermined user identity, accessing an address book associated with the user identity, responsive to recognized speech, selecting a telephone record in the address book and initiating an outbound call to the telephone record, and connecting the inbound call with the outbound call responsive to a connection established on the outbound call.

An alternative embodiment includes the steps of: accepting an inbound call, authenticating the inbound call against a predetermined user identity, receiving a dual tone frequency modulated input representing a desired outbound call target and initiating an outbound call to the outbound call target, and connecting the inbound call with the outbound call responsive to a connection established on the outbound call.

BRIEF DESCRIPTION OF THE DRAWINGS

For a fuller understanding of the invention, reference should be made to the following detailed description, taken in connection with the accompanying drawings, in which:

FIG. 11 is a diagrammatic illustration of outbound VoIP Calling according to an embodiment of the invention.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Integrated suites of applications such as StarOffice or Microsoft's Office provide a central repository of information most commonly accessed by the end user. The information includes:

Email
Calendar
Contacts

In the hierarchy of business, lower level employees might be responsible for organizing commonly used information, maintaining a database of business contacts, scheduling appointments and handling routine email communications. Many decision makers employ assistants to execute the aforementioned tasks which require a continual presence in front of a computer monitor. The decision maker can travel, meet with customers, and enjoy flexibility and freedom in his or her daily activities. The assistant can always be contacted by telephone to obtain critical information, schedule appointments or contact third parties.

Figure 1:
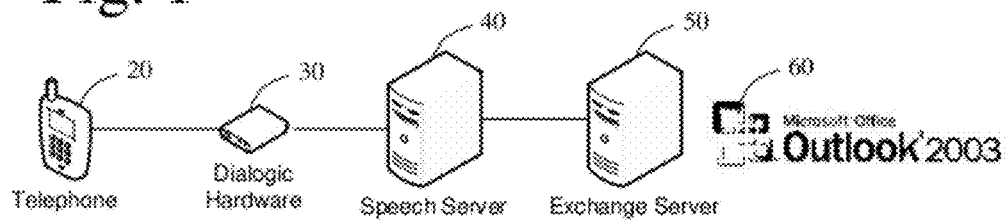
FIG. 1 is a diagrammatic illustration of Microsoft Exchange/Outlook telephony integration according to an embodiment of the invention.

The most popular corporate platform for information storage and retrieval is the Microsoft Exchange Server combined with the Microsoft Outlook client. An embodiment of the present invention for Exchange™ provides a general configuration as shown in FIG. 1. Telephone 20 connects to telephony interface 30. Telephony interface 30 may include that sold under the brand names DIALOGIC, BROOKTROUT, AVAYA, CISCO, and the like. Telephony equipment often utilizes a hardware abstraction layer using a well-established protocol such as telephony API (TAPI) or telephony interface manager (TIM). Telephony interface 30 is communicatively coupled to speech server 40. Speech server 40 acts as a logical intermediary between telephony interface 30 and the content database. In this example, the content database is Exchange Server 50 which normally accessed through desktop client application 60. It should be noted that desktop client application 60 can include web-based and mobile PDA versions of the client application. Speech server 40 provides adaptive logic to translate DTMF signals and speech output received by telephony interface 30 to commands to Exchange Server 50 whereby events are fired and/or information is retrieved and passed on to the appropriate target including, but not limited to, telephone 20.

Figure 2:
FIG. 2 is a diagrammatic illustration of multilayer telephony authentication according to an embodiment of the invention.

Extranet access is a security concern for any organization. However, the present invention employs a multilayered approach that combines concurrent hardware, passcode and biometric authentication. This combination is superior to virtually any other known authentication system as it is redundant on completely distinct verification systems. FIG. 2 illustrates the general authentication scheme. The identity of a user calling from telephone 20 is authenticated by speech server 40 by caller ID, voice print and DTMF PIN identities.

Figure 3:
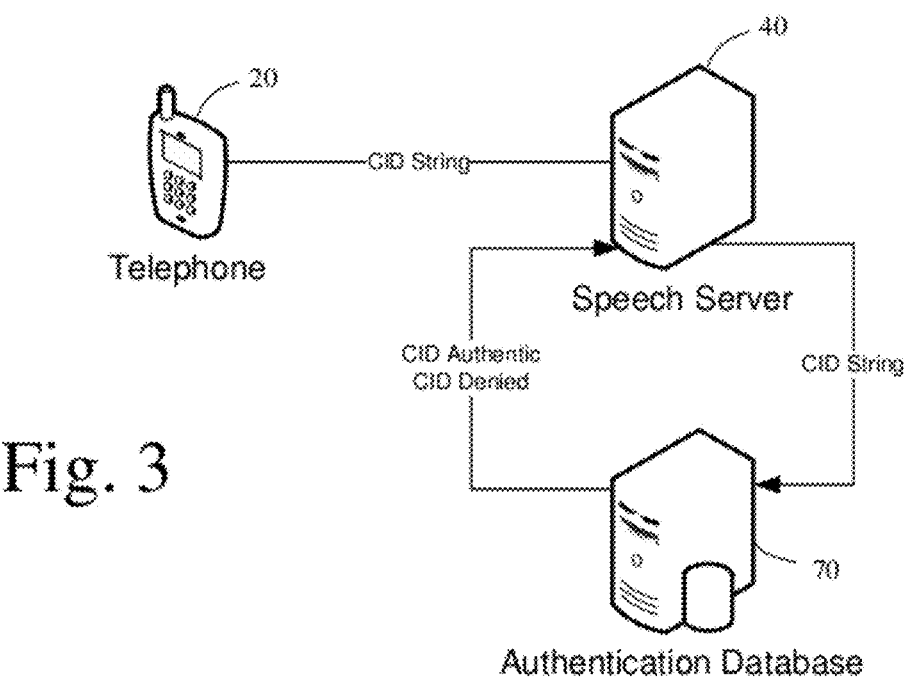
FIG. 3 is a diagrammatic illustration of CID authentication procedures according to an embodiment of the invention.

Caller ID authentication is tied to the mobile devices are that permitted to access the server. This is analogous to restricting access by IP addresses. Thus, a user may access an account from an array of pre-selected telephone numbers (i.e., home, mobile, branch office, etc.). Calls from alternative telephone numbers either are rejected or must engage in a more rigorous authentication procedure. In FIG. 3, an inbound call passes a caller identification string (CID) to speech server 40. The CID string is compared against authentication database 70. Database 70 might be a proprietary schema on a MS SQL or IBM DB2 system. Alternatively, the CID string may be compared against a field in the Microsoft Server Active Directory for the inbound caller. If the CID string matches one in the Authentication Database, then the first tier of security is passed. If the CID string does not match, then the inbound call is either denied or the level of authentication is escalated.

Figure 4:
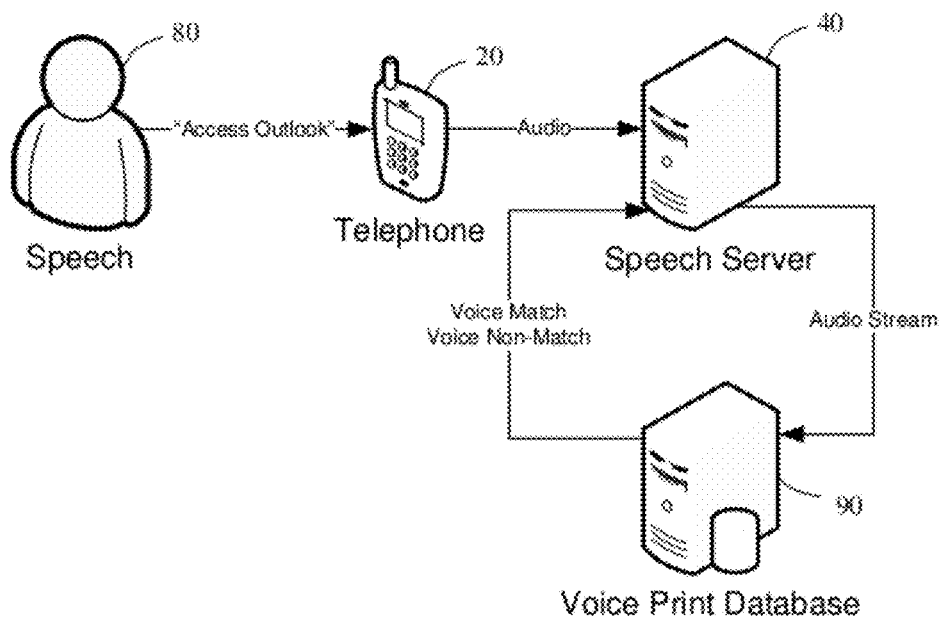
FIG. 4 is a diagrammatic illustration of voice print authentication according to an embodiment of the invention.

The next tier of user authentication employs voice print technology. The user is prompted to speak a non-confidential word or phrase. The inbound speech is compared against a known voice print for that particular user. An advantage of voice print technology is that users may call into the system in public, non-secure environments. Speaking a password or even a user login ID may compromise the security of the system. In FIG. 4, user 80 speaks a non-confidential phrase such as "Access Outlook" into telephone 20. The audio is then streamed to voice print database 90 via speech server 40. When user 80 initially registered on the system, she was prompted to say "Access Outlook" several times. The audio files for each repetition were normalized and hashed into a digital voice print. The digital voice print is then compared against the "login phrase" to determine whether the user is authentic. This biometric validation step may be layered upon several other security measures.

Figure 5:
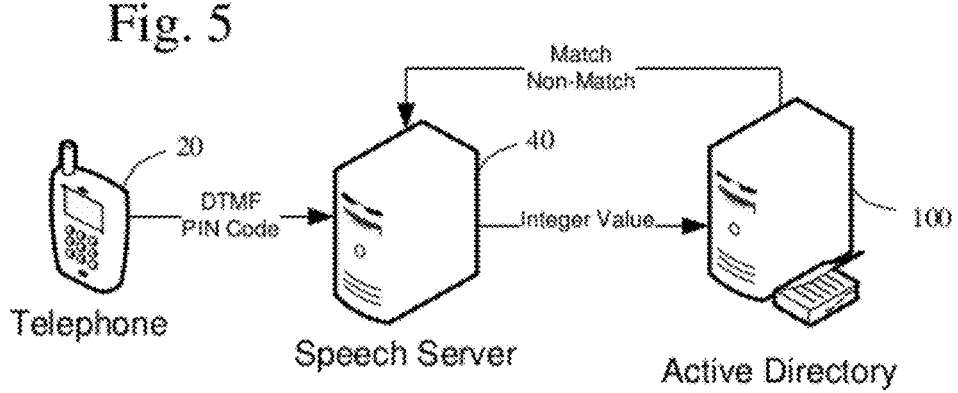
FIG. 5 is a diagrammatic illustration of PIN Authentication according to an embodiment of the invention.

PIN authentication is well-known in telephony. Modern telephones produce touch tones or dual-tone multi-frequency (DTMF) signals. These signals are interpreted, even through poor connections into integer and symbol values (i.e., 0-9, * and #). PIN Authentication is shown in FIG. 5 wherein buttons on telephone 20 generate DTMF signals interpreted by speech server 40 into integer values and compared against records in an active directory server 100. A Boolean value is then returned from active directory server to speech server 40 indicated whether the PIN value is authenticated.

Figure 6:
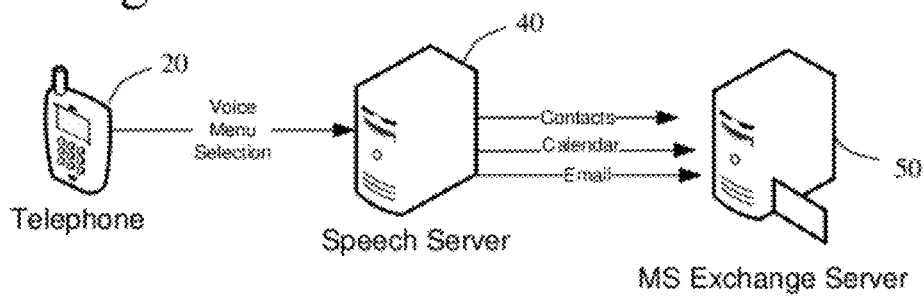
FIG. 6 is a diagrammatic illustration of application access to MS Exchange Server according to an embodiment of the invention.

Once authentication has been securely established, access to the desktop application must be intuitively provided through the limitations of a telephone interface. There is no mouse, no keyboard, and no monitor. Input is limited to twelve possible DTMF signals and speech. The three main repositories of information on Microsoft Exchange Server are contacts, calendar and email as shown in FIG. 6.

Figure 7:
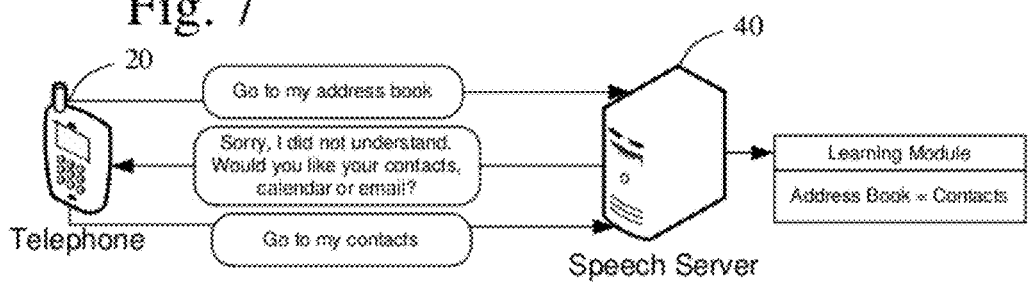
FIG. 7 is a diagrammatic illustration of a user request for unknown menu option according to an embodiment of the invention.

To achieve widespread acceptance of a telephony desktop control, the telephony control must be more than intuitive. It must adapt to the user. For example, in FIG. 7, a user seeking to access his contacts might request his "address book." While the system could be built to anticipate various synonyms of "contacts" a truly intelligent system learns and adapts.

Figure 8:
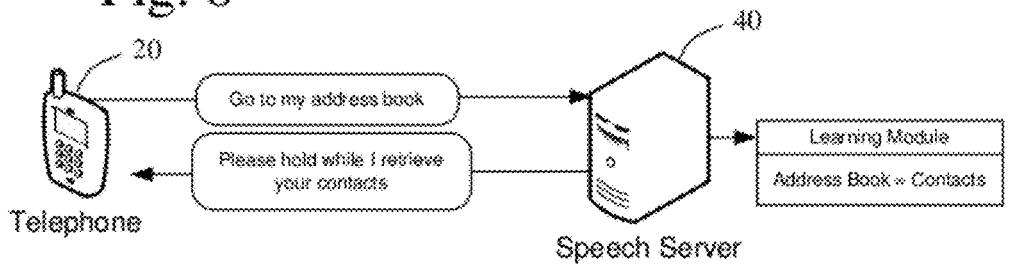
FIG. 8 is a diagrammatic illustration of a user request for menu option having trained equivalent according to an embodiment of the invention.

When the user requested his "address book" the system did not find a match. However, it did not discard the user's request. Rather, it held the "address book" request in a queue to determine whether an equivalent exists on the system. Once the user was presented with his viable options (contacts, calendar or email), the system determined that the user sought his contacts. The "address book" request is then taken out of the queue, digitized into a reference file and linked to the procedure for accessing "contacts." The user has thus trained the system to adapt to his terminology rather than the user adapting to the terminology conceived by the developer. FIG. 8 illustrates the invention wherein speech requests now made through telephone 20 for the "address book" are automatically equated to the original designation of "contacts." In addition, a value may be assigned to the confidence level of the association. For example, if speech server 40 mistakenly assigns "address book" to "email" it may disassociate the two terms if navigation to email responsive to a request for "address book" consistently results in a return to a menu prompt. In contrast, the value for the association may increase if a user consistently utilizes the email section responsive to a request for "address book."

There are four main levels of sophistication to telephony navigation and dictation:
1. DTMF—touch tone entry.
2. Voice Commands—audio pattern matching to pre-selected options.
3. Speaker-Dependant Voice Recognition—full dictation capability but the system is trained to an individual's particular speech and dialect.
4. Speaker-Independent Voice Recognition—full dictation capability without any training requirements.

Figure 9:
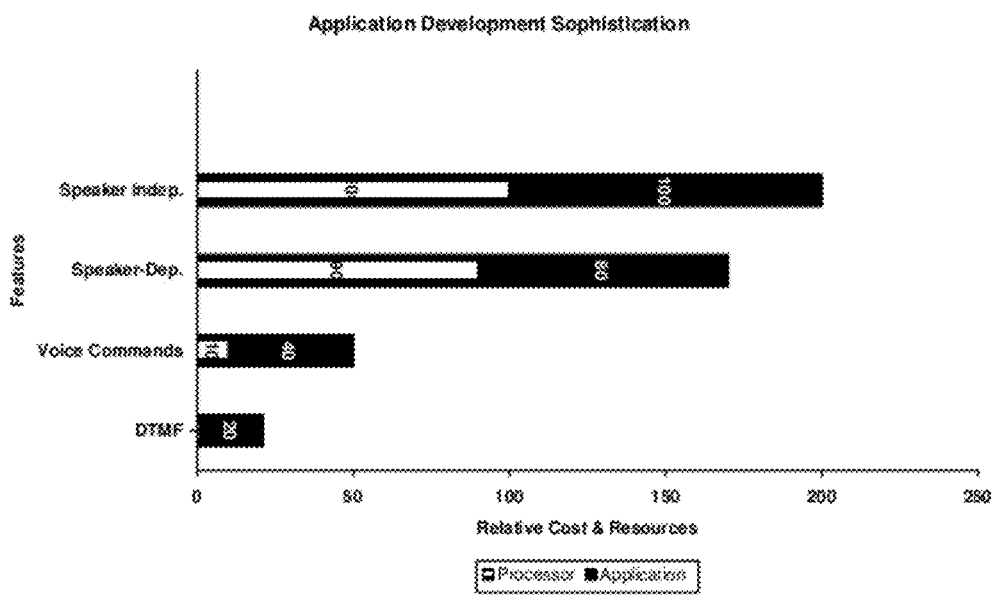
FIG. 9 is an illustrative representation of relative costs and resources for telephony communications.

FIG. 9 illustrates the relevant sophistication of the four categories of technology with only an illustrative, non-quantified scale of complexity. For real-world applications, dictation by telephony, whether speaker-dependent or independent is not currently feasible. However, advances in voice recognition technology, inexpensive multi-core processors and high-quality VoIP connections may rapidly bring those capabilities to the market.

Figure 10:
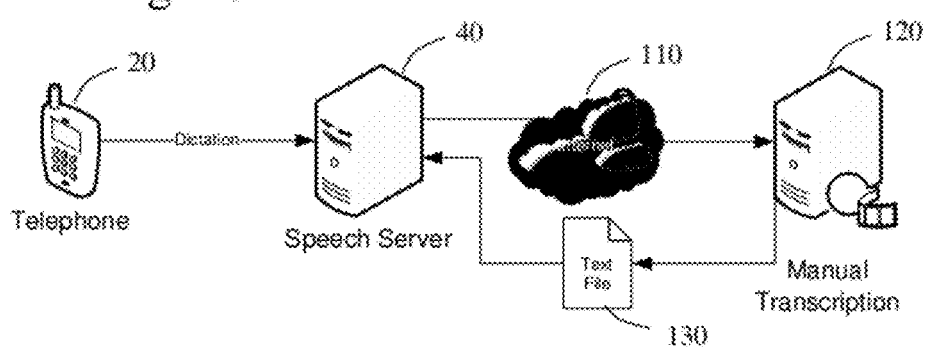
FIG. 10 is a diagrammatic illustration of manual transcription of telephony dictation according to an embodiment of the invention.

As part of a long-term strategy, transitional technologies should fill the gaps left by the formidable obstacles impeding speaker-independent dictation. As shown in FIG. 10, audio files are transmitted to low-cost transcription facilities 120 via wide area connection 110 and are returned to speech server 40 as text file 130 capable of text-to-speech output by speech server 40 to telephone 20.

Integrating functionality with the contacts database is the seamless initiation of outbound calling through the invention's telephony interface. In FIG. 11, a voice request is made to "Call Jack Baxter" through speech server 40. Speech server 40 searches through the user's contacts on Exchange Server 50 for the closest phonetic match to "Jack Baxter." Once the record is identified, the system reads all the phone numbers in the record and determines the user has both the mobile phone number and the business phone number of the desired contact. The system utilizes either text-to-speech or prerecorded prompts to query the user for the desired phone number. In the example, the user speaks "call mobile." The system then initiates a voice-over-IP (VoIP) call over wide area network 110 to mobile telephone 140 of the contact. When the telephone call is concluded the VoIP connection is closed but maintains its preexisting connection to the user for further instructions.

Three distinct editions of the system are anticipated:
1. An edition for Microsoft Exchange
2. An edition for Unix/Linux
3. An edition for Microsoft Outlook client The Microsoft Exchange edition resides behind a corporate firewall and integrates into the Microsoft BackOffice system (i.e., Exchange, SQL, IIS, etc.). Authentication is closely tied to preexisting security in the Active Directory system.

The Unix/Linux edition provides a more open architecture for integration with large dot-com infrastructures such as Google Gmail, Microsoft Hotmail and Yahoo Mail. Services are built for high-fault tolerance and for high scalability. The Unix/Linux edition includes not only a telephony component, but also a Java desktop application for direct voice command access to remotely stored information. A directional or lapel microphone accepts voice commands to execute tasks normally requiring a keyboard, mouse and monitor.

The Microsoft Outlook client edition provides a complete voice-actuated link to Microsoft Outlook 2003. No telephony component is required. A directional or lapel microphone accepts voice commands to execute tasks normally requiring a keyboard, mouse and monitor.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method of initiating outbound calls through a telephony interface comprising:
   accepting an inbound call;
   authenticating the inbound call against a predetermined user identity;
   accessing an address book associated with the user identity;
   receiving a spoken request;
   selecting a telephone record in the address book associated with the spoken request;
   initiating an outbound call to the telephone record; and
   connecting the inbound call with the outbound call responsive to a connection established on the outbound call.

2. A method of initiating outbound calls through a telephony interface comprising:
   accepting an inbound call;
   authenticating the inbound call against a predetermined user identity;
   receiving a dual-tone frequency-modulated input representing a desired outbound call target;
   initiating an outbound call to the outbound call target; and
   connecting the inbound call with the outbound call responsive to a connection established on the outbound call.

3. A computer system adapted to initiate outbound calls through a telephony interface comprising:
   a processor; and
   a tangible memory storage including software instructions that cause the computer system to perform:
      accepting an inbound call,
      authenticating the inbound call against a predetermined user identity,
      accessing an address book associated with the user identity,
      receiving a spoken request,
      selecting a telephone record in the address book associated with the spoken request,
      initiating an outbound call to the telephone record, and
      connecting the inbound call with the outbound call responsive to a connection established on the outbound call,
   wherein the computer initiates outbound calls through a telephony interface.

4. A computer system adapted to initiate outbound calls through a telephony interface comprising:
   a processor; and
   a tangible memory storage including software instructions that cause the computer system to perform:
      accepting an inbound call,
      authenticating the inbound call against a predetermined user identity,
      receiving a dual-tone frequency-modulated input representing a desired outbound call target,
      initiating an outbound call to the outbound call target, and
      connecting the inbound call with the outbound call responsive to a connection established on the outbound call,
   wherein the computer initiates outbound calls through a telephony interface.

5. An apparatus for initiating outbound calls through a telephony interface comprising:
   means for accepting an inbound call;
   means for authenticating the inbound call against a predetermined user identity;
   means for accessing an address book associated with the user identity;
   means for receiving a spoken request;
   means for selecting a telephone record in the address book associated with the spoken request;
   means for initiating an outbound call to the telephone record; and
   means for connecting the inbound call with the outbound call responsive to a connection established on the outbound call.

* * * * *